Patented May 13, 1941

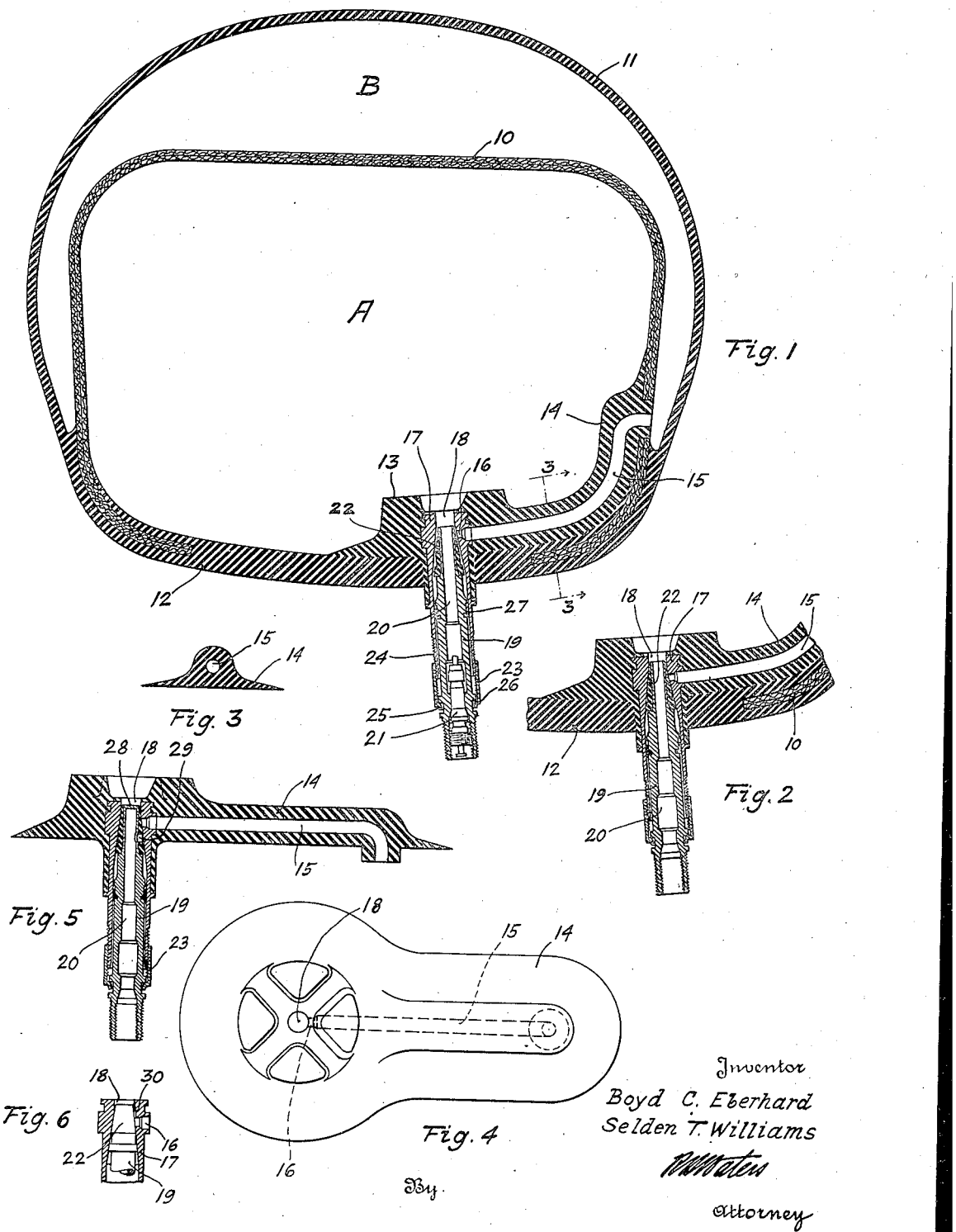

2,241,847

UNITED STATES PATENT OFFICE 2,241,847

VALVE FOR MULTICHAMBERED TUBES

Boyd C. Eberhard, Akron, Ohio, and Selden T. Williams, Bellerose, N. Y., assignors to Wingfoot Corporation, Wilmington, Del., a corporation of Delaware Application March 23, 1940, Serial No. 325,648

2 Claims. (Cl. 277—29)

The present invention relates to plural-chambered safety tubes and particularly to the valves for inflating same. One object of the invention is to provide a valve which is simple and durable and permits inflation of at least two tubes simultaneously.

Another object of the invention is to provide such a valve with means to cut off communication between chambers after inflation thereof or restrict the flow of air between chambers to such an extent that when one chamber fails, air can filter out of the other chamber but at a slow rate of speed, whereby the tire with which the tube is used will not go flat suddenly, thus permitting the driver to keep control of the vehicle to bring it to a safe stop.

Other objects of the invention will appear hereinafter as the description of same proceeds, the novel features, arrangements and combinations being set forth in the specification and in the claims thereunto appended.

In the drawing:

Fig. 1 is a transverse cross-section of a two-chambered tube equipped with a valve embodying the invention;

Fig. 2 is a similar fractional view showing the valve in a different position of adjustment;

Fig. 3 is a cross-section taken along the line 3—3 of Fig. 1;

Fig. 4 is a bottom plan view of the valve;

Fig. 5 is a cross-sectional view of a modified form of valve; and

Fig. 6 is a fragmentary view of another modification.

Safety tubes embodying a plurality of chambers when employed on airplanes sometimes have one or more chambers fail while the airplane is taking off or landing. The pilot who is unaware of the failure, therefore experiences difficulty in landing or stopping the ship and may even have a serious accident. Since it is unlikely that all chambers will fail during a given flight, it is proposed to cut off communication between the chambers after inflation thereof, but provide means for simultaneously and quickly inflating all, or at least a plural number of said chambers. Thus, the tube remains partly inflated upon failure of one of the chambers and aids the pilot in landing safely.

The invention is illustrated as applied to a tube of the character described in the patent to Lee No. 2,173,065 in which there are two chambers, one within the other, both having a common wall at the base. The main difference, however, is that in this case the inner tube is imperforate instead of provided with a small port for slow leakage of air out of one chamber in case of failure of the other, and both tubes are simultaneously inflated through different ports.

The tube illustrated in Fig. 1 has an inner chamber A formed by the inextensible fabric wall 10 and an outer chamber B formed by the wall 10 and the outer rubber wall 11. Both tubes are joined at their bases to form a common wall 12.

The valve is provided with a rubber base portion 13 having a lateral extension 14, both of which are vulcanized to the inner side of the wall 10 as clearly illustrated in Fig. 1. The extension is provided with a longitudinal passage 15 which communicates with the outer chamber B and the port 16 in the hollow metal stem 17 embedded in the rubber base 13, whereby air, supplied through the hollow stem, will pass through the passage 15 into the outer chamber to inflate the same. Air enters the inner chamber through the port 18 at the inner end of the stem 17.

The stem 17 has a tubular extension 19 having a bore 20, the outer end of which is provided with any type of check valve, such as 21, such as usually employed to prevent back flow of air out of tubes of this character and referred to hereinafter as a valve insert.

The extension 19 is longitudinally movable in the valve stem and is provided at its inner end with a conical rubber valve head 22 adapted to seat on a corresponding valve seat on the stem adjacent the port 16, whereby when seated the valve head cuts off communication between the chambers A and B, whereby in case one chamber loses its air the other will not. This position of the valve head is shown in Fig. 2. In Fig. 1 the valve head 22 is shown off its seat and air entering the valve extension bore 20 may pass around the valve head through port 16 and passage 15 into chamber B to inflate same at the same time that some air is passing into the chamber A through the port 18.

After inflation the extension 19 is moved longitudinally into the position shown in Fig. 2 by means of the internally screw-threaded collar 23 which is threaded onto threads 24 on the outside of the stem 17. The collar is reduced as at 25 to engage a shoulder 26 on the extension to thus advance the extension inwardly upon rotation of the collar 24 in the right direction.

The tube is first inflated by supplying air thereto through the extension and ports 16 and 18 while the ports are in the position shown in Fig. 1. The collar 24 is then rotated to advance the extension 19 inwardly to seat the valve head 22 and thus cut off communication between the chambers.

The extension 19 is provided with an annular, flexible, rubber sealing ring 27 which prevents back flow of air around the extension during or after inflation.

A somewhat modified form of valve is shown in Fig. 5 in which the same reference characters refer to similar parts in Fig. 1. The main difference in this valve over that shown in Fig. 1 is that the valve head shown in Fig. 2 is closed as at 28 instead of open as in Fig. 1. To permit air to enter the chambers A and B when the valve head is off its seat, the valve head is provided with a lateral opening 29 which permits the air to leave the extension and circulate around the outside of the valve head and enter the ports 16 and 18 to inflate the chambers. In this form of the invention the chambers not only have no intercommunication, but the air is prevented from leaking out of chamber A through the extension should the valve insert 21 be defective.

In case it is desired to make the tube so that it will function the same as the tube shown in the aforesaid Lee patent to let the air out of an undamaged chamber slowly, a small opening of about .025 to .050 inch in diameter may be provided in the wall 10 or between the wall of the passage 15 and chamber A, or by a leaky seat for the valve head 22. In the latter construction, since there is an imperfect seating of the valve-head, the air can filter around the valve head into the atmosphere from either chamber in case of failure of the other chamber. This latter feature is shown in Fig. 6, in which the imperfect seat is shown by a slight groove 30 in the valve seat in the stem 17.

Obviously various changes may be made in the particular arrangement, construction and assembly of the parts without departing from the spirit of the invention and therefore we do not wish to limit our invention except as hereinafter set forth in the appended claims.

Having thus fully described our invention, what we claim and desire to secure by Letters Patent of the United States is:

1. A valve comprising a rigid stem portion having a longitudinal bore extending therethrough, said bore being provided at its inner end with a tapered seat, a lateral port communicating with the outside of said stem and with said bore within the area of said seat, an extension having a longitudinal passage therethrough slidably mounted within said bore and carrying a tapered plug at the inner end thereof adapted to close said port when seated on said tapered seat, a valve insert in the outer end of said hollow extension to prevent back flow, means for moving said extension axially into and out of engagement with said seat to close and open said port as desired, whereby air supplied to said bore may escape simultaneously through the open inner end of said bore and said port when said plug is off said seat and said inner open end and said port will be cut off from communication with each other when said plug is in engagement with said seat.

2. A device as set forth in claim 1 in which said extension is closed at the inner end thereof, but has a lateral opening through said plug so arranged with respect to said seat at the inner end of said bore that it cannot be in registration with said lateral port when said plug is seated on said seat, whereby not only is the communication between said open inner end and said port cut off but back-flow of air through the hollow extension is entirely cut off independently of said valve insert.

BOYD C. EBERHARD.
SELDEN T. WILLIAMS.